(12) United States Patent
Dombrowski et al.

(10) Patent No.: US 8,886,660 B2
(45) Date of Patent: Nov. 11, 2014

(54) METHOD AND APPARATUS FOR TRACKING A CHANGE IN A COLLECTION OF WEB DOCUMENTS

(75) Inventors: Bernhard Dombrowski, Landshut (DE); Karl Klug, Miesbach (DE); Michal Skubacz, Gröbenzell (DE); Peter Suda, München (DE); Jürgen Totzke, Poing (DE); Cai-Nicolas Ziegler, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1815 days.

(21) Appl. No.: 12/027,316

(22) Filed: Feb. 7, 2008

(65) Prior Publication Data

US 2009/0204595 A1   Aug. 13, 2009

(51) Int. Cl.
*G06F 17/30* (2006.01)
(52) U.S. Cl.
CPC .................................. *G06F 17/3089* (2013.01)
USPC ........................................................... 707/758
(58) Field of Classification Search
USPC ........... 707/706–707, 709–710, 999.005, 758
See application file for complete search history.

(56) References Cited

U.S. PATENT DOCUMENTS

| | | | | |
|---|---|---|---|---|
| 7,310,632 | B2* | 12/2007 | Meek et al. | 707/709 |
| 2006/0047649 | A1* | 3/2006 | Liang | 707/4 |
| 2007/0185871 | A1* | 8/2007 | Canright et al. | 707/7 |

* cited by examiner

*Primary Examiner* — Thu-Nguyet Le
(74) *Attorney, Agent, or Firm* — Buchanan Ingersoll & Rooney PC

(57) ABSTRACT

A method and an apparatus for tracking changes in a collection of web documents, for example, provided by a web site. The web documents are retrieved at a first assigned point in time and a second assigned point in time. Then a similarity measure for a combination of a retrieved web document at a first assigned point in time and a retrieved web document at a second assigned point in time is calculated for determining pairs of corresponding web documents. By comparing said calculated similarity measure of a pair of corresponding web documents with predetermined thresholds for the similarity measure a change in the content of the corresponding web document between the first assigned point in time and second assigned point in time is detected. Instead of referring to identifiers like URLs for web pages the content similarities of web pages are considered. The proposed strategy facilitates the work of marketing analysts.

8 Claims, 3 Drawing Sheets

METHOD AND APPARATUS FOR TRACKING A CHANGE IN A COLLECTION OF WEB DOCUMENTS

FIELD OF THE INVENTION

The invention relates to methods and apparatuses for tracking or monitoring changes in web documents. Web documents, as for example web pages, may change if the corresponding site owner or editor adds, removes or modifies content from the web site. This disclosure provides strategies for automatically tracking such changes in the content.

BACKGROUND OF THE INVENTION

For example, in order to monitor competitors it is vital to observe the web site providing information on the competitor's business. Monitoring web sites, for example, allows marketing analysts or strategic development officers to identify new products competitors have released, recent events taking place, and other facts that may be of value for adapting the own company's marketing strategy. It may be of interest, for example, to know about road shows or large marketing campaigns of other market participants.

Conventional manual surveillance of web sites is generally not feasible due to the abundance of information stored in hundreds or thousands of web pages bearing content. Manual handling of such huge information resources is extremely time-consuming and vulnerable to errors when one tries to track changes over time. Conventional automatic analysis of web pages is also prone to errors due to the fact that a URL (Uniform Resource Locator) as a reference to an information providing web page is assumed to be stable over time. But, often web pages are generated from databases that lead to changing site internal URLs (Uniform Resource Locator)and thus are not stable. Also session management protocols may have an impact on the web pages site internal URL-structure.

Conventional change monitoring systems provide graphical interfaces for highlighting changes that have been made on a web page with respect to a preceding inspection. However, highlighting often relies on a user specified labeling of relevant areas on a web page or in the underlying html-code.

Therefore it is desirable to obtain a method for tracking changes in the content of a web site that is easy to implement and robust against changes of the identifiers of the included web pages, as for example the URLs, and content variations due to embedded ads and dynamic content allocation.

SUMMARY OF THE INVENTION

This disclosure presents methods and apparatuses for tracking a change in a collection of web documents, wherein those web documents are, for example, provided by a web server. To detect changes, all web documents from a collection of web documents, as for example a specific web site, are retrieved and stored at a first assigned point in time and a later second assigned point in time providing two snapshots of the collection at different times. Then a similarity measure is applied that measures the similarity between each document in the first snapshot and all documents in the second. By comparing the similarity score value assigned to a pair of documents from different snapshots with a lower threshold for a reasonable similarity a decision can be made whether a document from the first shot has a corresponding document in the second snapshot or not. If there is more than one candidate for the correspondence, for example, the document with the highest similarity score value is taken as being the corresponding one.

Often there are only minor changes in a web document over time. For example, a date information may be changed, but the rest remains the same. To overcome such minor changes an upper similarity threshold is used. If the similarity score value is greater than this upper threshold a web document is to be considered as not substantially changed and thus the two documents are assumed to be equal in respect to the given similarity measure. Both, lower and upper thresholds may be predetermined as a function of the content of the web documents.

The retrieving, calculating and comparing using the said similarity measure may be repeated at consecutive times for tracking the time evaluation of the content of the web site under consideration.

The strategy allows the finding of corresponding web documents, i.e. web documents that purport the same or similar content but due to rereferencing through the content provider have different identifiers as for example URLs.

This disclosure also describes a method for tracking changes in web document collections based on content objects. Often, each document is built up from content objects, as for example, text-, graphics-, applet-, video- or audio-objects. This fact enables a finer grained version as another aspect of the method for tracking changes in collections of web documents. Then, all web documents from a collection of web documents, as for example a specific web site, are retrieved and stored at a first assigned point in time and a later second assigned point in time thereby providing two snapshots of the collection at different times. Then, for each document in the snapshots the content objects are segmented and extracted. Next, using content-type specific similarity measures and type-specific thresholds pairs of corresponding content objects in web documents are identified.

The latter aspect of the method for tracking or monitoring changes allows the finding of corresponding content objects, i.e. web document parts, that purport the same or similar content but due to re-engineering and editing by the content provider may have different locations in the collection of documents.

This disclosure further describes an apparatus for tracking a change in a collection of web documents wherein said web documents are provided by a web site. The apparatus comprises an interface which is communicatively coupled to said web site, for example through the internet, a storage means for storing retrieved web documents, and a processing platform that, for example, can be implemented as a programmable processor or computer. The processing platform is implemented to retrieve the web documents of said collection of web documents at the first assigned point in time and at a second assigned point in time. The processing platform is also adapted to calculate a similarity measure for a combination of a retrieved web document at the first assigned point in time and a retrieved web document at the second assigned point in time for determining a pair of corresponding web documents. The processing platform is implemented to compare said calculated similarity measure for said pair of corresponding web documents with an upper threshold for the similarity measure for detecting a change in the content of the corresponding web documents between the first assigned point in time and the second assigned point in time.

The apparatus, for example, can be realized by a programmable computer. Additionally, a computer program may be implemented based on one of the above aspects of a method for tracking a change in a collection of web documents to initiate an execution of such a method on a computer.

DETAILED DESCRIPTION OF EMBODIMENTS OF THE INVENTION

In the following embodiments of the methods and apparatus for tracking a change in a collection of web documents are described with reference to the enclosed figures.

The following disclosure specifies a framework that handles the tracking or monitoring of a plurality of web pages, as for example provided through a web site, in a fully automatic fashion. Instead of conventional marketing analysts having to observe and spot changes on the available web pages now machines, such as computers or program applets, may perform this task. In one example, in particular a textual content of web pages is considered. However, the method for tracking or monitoring changes may also be applied to web documents containing rich media, such as videos or images. Generally, the hereby presented concepts employ a similarity measure for retrieved web documents producing a similarity score value.

In this disclosure the symbol $p_i$ refers to a web document such as a web page. A plurality of web documents $p_i$ forms a web site that is addressable, for example, through a top level domain. At a first assigned point in time k a snapshot $T_k$ comprising all available documents of the web site at point in time k is given. The considered web site comprises web documents $p_i \epsilon T_k$. At a later point in time k'>k, for example a predetermined time step k'=k+1, for example a day, week or an other time interval, the considered web site may comprise web documents $p_j \epsilon T_{k+1}$.

Figure 3:
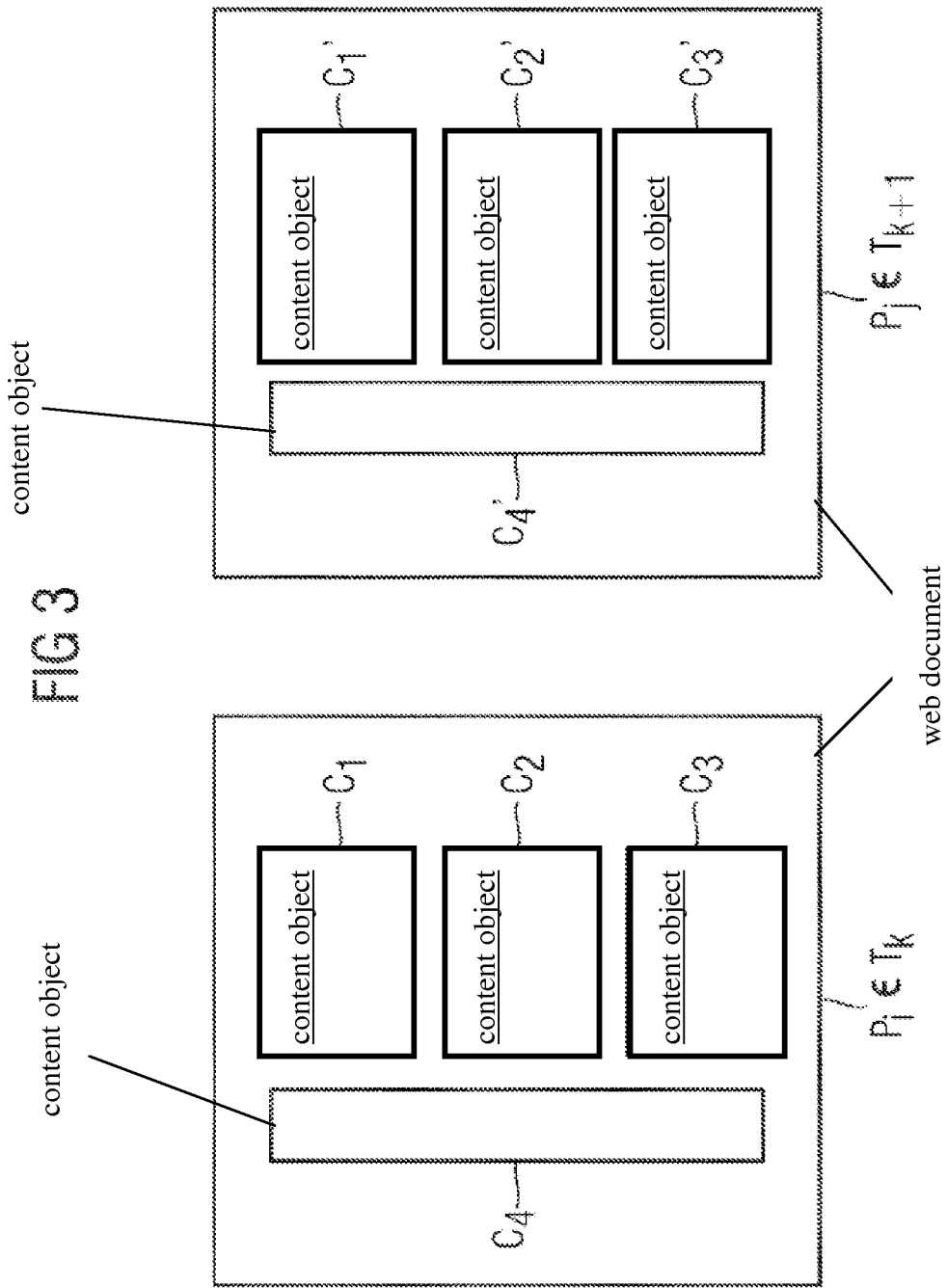
FIG. 3 shows a schematic view of web pages at different points in time.

Usually, a web document is built up from content objects such as text portions or other media types. For example, FIG. 3 shows schematic web documents $p_i \epsilon T_k$ and $p_j \epsilon T_{k+1}$ including content objects $c_i$ with i=1, 2, 3, 4. It will be referred to FIG. 3 in more detail subsequently.

A similarity measure $sim(p_i, p_j)$ maps two web documents $p_i$ and $p_j$ to a scalar similarity score value $s_{ij}=sim(p_i, p_j)$ being a measure for the similarity of those two documents. For example $s_{ij}$ may run from 0 to 1 or from 0% to 100%. A similarity score value $s_{ij}=1$ or $s_{ij}=100\%$ means that the two web documents $p_i$ and $p_j$ are identical. Similarity measures, for example, may employ vector space query models for representing text documents that occur in the considered web site.

Figure 1:
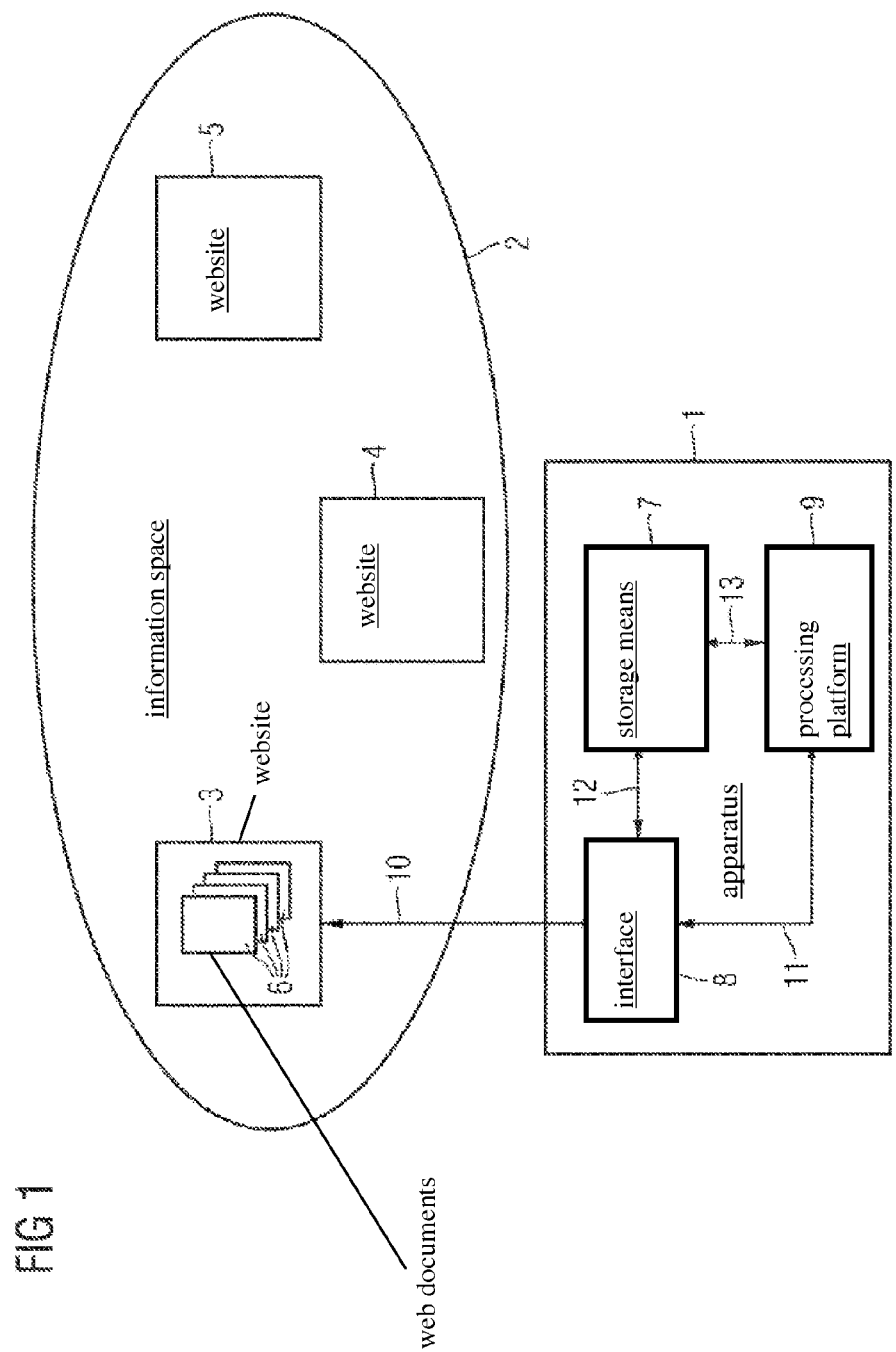
FIG. 1 shows an embodiment of an apparatus for tracking changes in a collection of web pages.

FIG. 1 shows an apparatus 1 that may be adapted to perform a method for tracking changes in the content of a web site. FIG. 1 shows an information space 2 such as the internet that includes web sites 3, 4, 5. Each web site 3, 4, 5 may be considered a web server relating to a generic top level domain in the internet. For example, web server or web site 3 provides a plurality or a collection of web documents 6 to users of the internet 2. The apparatus 1 for tracking changes in the content of the web site 3 comprises an interface 8, a storage means 7 and a processing platform 9. The interface 8 is communicatively coupled to the web site 3 which is illustrated through the arrow 10. The connection, for example can be realized by the internet infrastructure.

Processing platform 9 is coupled to the storage means 7 and the interface 11 and may exchange control and data signals which is indicated through the arrows 11 and 13. The processing platform 9 may be implemented as a computer or a programmable processor. However, also the apparatus 1 may be implemented as a computer being coupled to the internet 2. The storage means 7 can be implemented by a conventional memory, such as, a hard drive, flash or other memory. The processing platform 9 is implemented to execute, for example, a computer code relating to the method as shown as an exemplary flow chart in FIG. 2.

Figure 2:
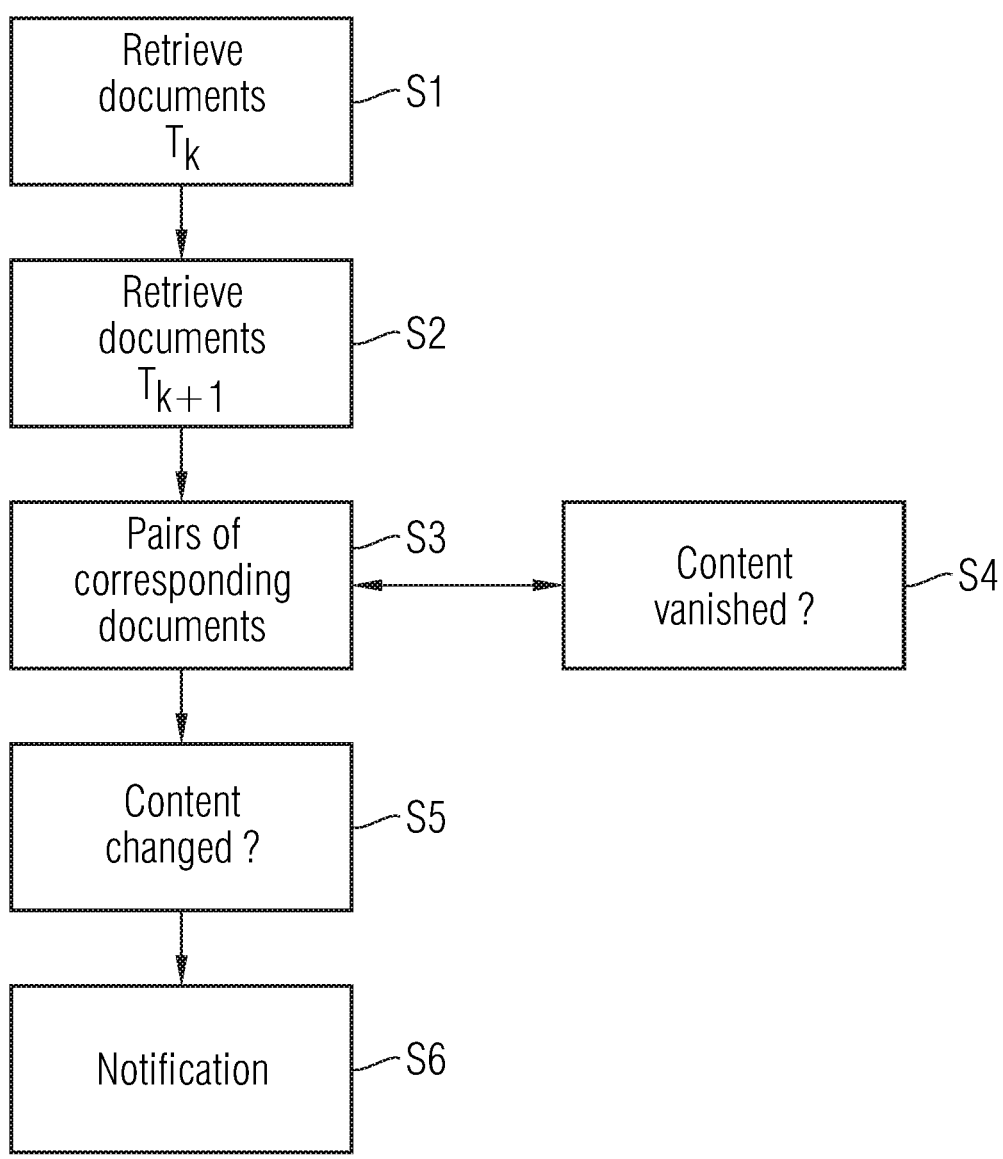
FIG. 2 shows an exemplary flow chart for a method for tracking changes in a collection of web pages.

FIG. 2 shows an exemplary flow chart of an embodiment for a method for tracking the change of, for example, the web site 3 as shown in FIG. 1. The method steps S1-S6 may be implemented as dedicated computer program code, as for example, program modules. However, also dedicated hardware may be used for carrying out the method steps.

In a first step S1 all documents of the considered web site 3 are retrieved from the web site 3 at an assigned point in time k for obtaining snapshot $T_k$. At a later point in time k+1 in step S2, again, all documents available from the web site 3 are retrieved. This occurs at a later assigned point in time k+1 corresponding to snapshot $T_{k+1}$. The terms $T_k$, $T_{k+1}$, respectively, refer to momentary snapshots of the web site's 3 current state at point in time k and k+1, respectively. For example, $T_{k+1}$ is the set of all web pages of a given web site 3 at point in time k+1. The assigned points in time for $T_k$, $T_{k+1}$ can be predetermined so as to automatically retrieve all documents available from the web site 3 as shown in FIG. 1. The retrieved documents are, for example, stored in the memory 7, and are available for further analysis.

Next, in step S3 pairs of corresponding documents are identified. Two retrieved documents $p_1 \epsilon T_k$ and $p_j \epsilon=T_{k+1}$ are assumed to correspond to each other if the similarity score value $sim(p_i, p_j)$ between these two documents is sufficiently high above a predetermined threshold value $B_1$.

In one embodiment of the method, for example, for each retrieved web document $p_i$ at the first assigned point in time k, and $T_k$ respectively, all similarity score values with the retrieved documents $p_j$ from $T_{k+1}$ are calculated. The one document $p_j \epsilon T_{k+1}$ yielding the highest similarity score value above the threshold $B_1$, i.e. $s_{ij}=sim(p_i, p_s)$ and $s_{ij}>B_1$, with $p_s \epsilon T_k$ is then identified as the "corresponding web document". For example, $B_1$ may be chosen 0.95 or 95%. In contrast to conventional approaches no uniform source locator (URL) for the web documents is used but the content of the document is analyzed with respect to the content at a later point in time as a function of the similarity measure.

If in step S3 for a given web document retrieved from $T_k$ no document retrieved from $T_{k+1}$ can be identified having a sufficiently high similarity score the content has vanished from the web site which can be indicated by a notification message in step S4. For example, apparatus 1 may sent an email message to the user providing information on content that is no longer available from the monitored web site 3. However, if there is a document $p_j \epsilon T_{k+1}$ such that for all documents $p_i \epsilon T_k$ $sim(p_i, p_j) \leq B_1$ holds, $p_j$ can be identified as a new document in the collection, which can be also indicated by a notification message.

In the subsequent method step S5 it is checked whether the content of the remaining corresponding documents of the web site 3 has changed between the assigned times k and k+1 relating to snapshots $T_k$ and $T_{k+1}$. Two corresponding documents, i.e. pairs of retrieved web documents from $T_k$ and $T_{k+1}$ that have a high enough similarity score above $B_1$ are considered to have been changed if the similarity score is below an upper similarity threshold $B_u$ as well. For example, in step S5 the degree of dissimilarity between the page $p_i \epsilon T_k$ corresponding to $p_j \epsilon T_{k+1}$ is determined. The pair $(p_i, p_j) \epsilon T_k \times T_{k+1}$, for example, is considered to have been changed if $B_1 < s_{ij} < B_u = 0.95$ or 95%. In principle, the upper and lower threshold values $B_u$ and $B_1$ do not have to be different but may also have the same value or other combinations. For example, in step 3 $B_1$ can be 90% and in step S5 $B_u$ can be 96% percent.

The upper similarity threshold value $B_u$ guarantees that pages that are very similar but not identical to an older page $p_i$ are not counted as being modified. If, for example, a web document contains a field relating to a date when the content of that page was edited the relevant content has probably not changed, but the date changes. Therefore, retrieved web documents at different points in time conventionally would be considered to have a changed or modified content. Employing a similarity score value $s_{ij} \epsilon [B_1, B_u]$ however does not necessarily lead to such a conclusion. The upper and lower bound $B_u$, $B_1$ may be set as a function of the context or the data type, e.g. the date, that is retrieved from the web site 3.

If pages are found in step S5 that have a changed content a notification is sent in step S6 informing, for example, a marketing analyst of the modification in the monitored web site 3.

FIG. 3, for example, shows an illustration of web sites $p_i \epsilon T_k$ and $p_j \epsilon T_{k+1}$ referring to subsequent time slices. In an alternative embodiment of the method for tracking modifications in web sites content objects are extracted from the web documents forming the actual web site. For example, in FIG. 3 content objects $c_1$, $c_2$, $c_3$ and $c_4$ are shown for page $p_i \epsilon T_k$. At a later point in time k+1, the web document $p_j \epsilon T_{k+1}$ has the content objects $c_1'$, $c_2'$, $c_3'$ and $c_4'$.

For example, in FIG. 3 content objects $c_2$ may refer to a text object and content $c_3$ to some rich media, like an audio file or a flash animation. Often additional menu buttons comprising also text are arranged on a sidebar $c_4$. If now at a later time slice or snapshot $T_{k+1}$ the sidebar menu $c_4$ comprising text is arranged as content object $c_1'$, and $c_4'$ contains the content of $c_1$ the content of documents $p_i$ and $p_j$ remains the same for both times slices $T_k$ and $T_{k+1}$. However, a conventional method for tracking changes would identify the two pages $p_i$ and $p_j$ as being different. By determining first corresponding documents or content objects as illustrated in step S3 of FIG. 2 the actual content is monitored.

Therefore, in a variation of the method as described before, first content objects are segmented from all documents provided from a web site. Then, at a later point in time k+1, again, all available content objects are retrieved. A basic example is shown in FIG. 3 wherein $c_1$-$c_4$ and $c_1'$-$c_4'$ are retrieved content objects. In the example mentioned before the local similarity score for $c_4$ and $c_1$ would yield 100% if the contents are exchanged between to objects from $T_k$ to $T_{k+1}$. Hence, both content objects $c_4$ and $c_1'$ are considered as corresponding to each other. Hence, the local similarity score $s_{ij} = \text{sim}(c_4, c_1') = 1 > B_1$.

Next, it is checked whether $s_{ij} < B_u$, i.e. whether a change with regard to the content has occurred. If the content is just exchanged between $c_1$ and $c_4$ referring to $T_k$ the similarity would also yield 1.0 or 100%, and therefore no change or modification is detected.

However, if for example a change has occurred between the content object $c_2$ and $c_2'$, for instance, by changing the respective text, and the original text corresponding to $c_2$ is not provided anymore for the web site the apparatus or system recognizes that no best matching or no corresponding content object is available from the web site at $T_{k+1}$. If however, minor changes in the text referring to $c_2$ and $c_2'$ occurred, then the system recognizes that $\text{sim}(c_2, c_2') \epsilon [B_1, B_u]$. Hence, the corresponding pair $c_2$, $c_2'$ satisfies the maximum similarly criterion $\text{sim}(c_2, c_2') < B_u$ for the corresponding objects $c_2$, $c_2'$. The analyst using the system may then receive an automatically generated notification message. The notification message, for example, can be sent by electronic mail or by a message popping up on the monitoring system on a dedicated display. However, also other means of communication can be contemplated.

Similarity functions or measures used may be designed as a function of the underlying type of media. For example, for textual content other similarity functions are used than for video streams, pod casts, graphics etc. The method may also be modified by extracting the plane informative textual content from the web pages. This can be done by employing HTML wrappers or other program modules that extract only the textual content from web pages originating from a web site. Further formatting data or symbols are then omitted.

As a similarity measure, for example, well known vector space query models may be employed. A vector model is an algebraic model for representing text documents as vectors or identifiers. Textual similarity, for example, can be calculated as a function of tf-idf weights (term frequency-inverse document frequency). The term frequency in a given document is the number of times that a given term appears in the document. The inverse term frequency is a measure of the general importance of this term. For example, the inverse document frequency can be obtained by dividing the number of all documents by the number of documents containing the term and then taking the logarithm of that quotient. Sometimes, for text matching or similarity calculation the tf-idf vectors of the documents are chosen as attribute vectors. Then a cosine similarity as a measure of the similarity between those two vectors can be calculated. However, other similarity measures can be employed for calculating similarity score values between content objects or web pages retrieved at different points in time.

This disclosure allows monitoring web sites for changes occurring over time. For example, if a given web page exhibits sufficient modifications from point in time k to point in time k+1 the changes are detected automatically. This is efficiently done because corresponding content objects $c_j$ in $T_{k+1}$ are paired or grouped with content objects $c_i$ in $T_k$. The similarity measure in particular allows to spot changes of relevant text or other objects in HTML pages $p_i$ and $p_j$ including those content objects $c_i$, $c_j$. However, the application can also be modified to consider rich media, i.e. media other than text or hypertext markup.

The invention claimed is:

1. A method for tracking a change in a collection of web documents, said web documents being provided by a web site, the method comprising:
   retrieving the web documents of said collection of web documents at a first assigned point in time and at a second assigned point in time that is later than the first assigned point in time;
   calculating a similarity measure for a combination of a first retrieved web document of the retrieved web documents at the first assigned point in time and a second retrieved web document of the retrieved web documents at the second assigned point in time to determine whether the second retrieved document corresponds with the first retrieved document;
   if the second retrieved web document corresponds to the first retrieved web document, comparing said calculated similarity measure for said first and second retrieved web documents with an upper similarity threshold for the similarity measure for detecting a substantial change in content of the corresponding first and second retrieved web documents; and identifying pairs of corresponding web documents retrieved at the first assigned point in time and of web documents retrieved at the second assigned point in time, a similarity score value between the corresponding web documents of said pairs exceeding a predetermined lower similarity threshold value and falling below the upper similarity threshold, the upper similarity threshold being a predetermined upper similarity threshold value.

2. The method of claim 1 wherein said lower similarity threshold value is predetermined as a function of a content type of the web documents.

3. The method of claim 1 wherein said upper similarity threshold value is predetermined as a function of a content type of the web documents.

4. A method for tracking changes in web pages provided by a web site, comprising:

retrieving all web pages provided by said web site at a first point in time;

extracting all content objects from said retrieved web pages at the first point in time;

retrieving all web pages provided by said web site at a second point in time, said second point in time being later than said first point in time;

extracting content objects from said retrieved web pages at the second point in time, the extracted content objects from said retrieved web pages at the first point in time being first content objects and the extracted content objects from said retrieved web pages at the second point in time being second content objects;

calculating similarity score values for comparing the first content objects with the second content objects as a function of a vector space model;

determining which second content object corresponds to which first content object by determining which second content object has a highest similarity score value as corresponding to the first content object; and for each pair of corresponding first and second content objects, comparing the similarity score value between the corresponding first and second content objects of that pair with a predetermined similarity threshold value.

5. The method of claim 4, further comprising storing the extracted first and second content objects.

6. The method of claim 4, wherein each of said web pages is referenced by a uniform source locator relating to a same top level domain.

7. An apparatus for tracking a change in a collection of web documents, said web documents being provided by a web site, comprising:

an interface communicatively coupled to said web site;

at least one storage device for storing retrieved web documents; and a processing platform being implemented to process a method comprising:

retrieving all web pages provided by said web site at a first point in time;

extracting all content objects from said retrieved web pages at the first point in time;

retrieving all web pages provided by said web site at a second point in time, said second point in time being later than said first point in time;

extracting content objects from said retrieved web pages at the second point in time, the extracted content objects from said retrieved web pages at the first point in time being first content objects and the extracted content objects from said retrieved web pages at the second point in time being second content objects;

calculating similarity score values for comparing the first content objects with the second content objects;

determining which second content object corresponds to which first content object by determining which second content object has a highest similarity score value as compared to the first content object; and for each pair of corresponding first and second content objects, comparing the similarity score value between the corresponding first and second content objects of that pair with a predetermined similarity threshold value.

8. The apparatus of claim 7, wherein said apparatus is a computer and wherein the comparing of the similarity score value between the corresponding first and second content objects is to determine whether a substantial change exists between the first and second content objects of each of the pairs, and wherein the substantial change is more than just a change of date information.

* * * * *